(12) United States Patent
Jodet et al.

(10) Patent No.: US 11,572,832 B2
(45) Date of Patent: Feb. 7, 2023

(54) METHOD FOR PREPARING A SUPPORT AND FOR ACOUSTIC MANAGEMENT ON A TURBINE ENGINE OR A NACELLE

(71) Applicant: SAFRAN AIRCRAFT ENGINES, Paris (FR)

(72) Inventors: Norman Bruno André Jodet, Moissy-Cramayel (FR); Jean-Michel Daniel Paul Boiteux, Moissy-Cramayel (FR); Francis Couillard, Moissy-Cramayel (FR); Jérémy Paul Francisco Gonzalez, Moissy-Cramayel (FR); Stéphane Orcel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/278,557

(22) PCT Filed: Sep. 20, 2019

(86) PCT No.: PCT/FR2019/052208
§ 371 (c)(1),
(2) Date: Mar. 22, 2021

(87) PCT Pub. No.: WO2020/058650
PCT Pub. Date: Mar. 26, 2020

(65) Prior Publication Data
US 2021/0348559 A1 Nov. 11, 2021

(30) Foreign Application Priority Data
Sep. 20, 2018 (FR) ...................................... 1858549

(51) Int. Cl.
*F02C 7/045* (2006.01)
*B64D 33/02* (2006.01)

(52) U.S. Cl.
CPC .............. *F02C 7/045* (2013.01); *B64D 33/02* (2013.01); *B64D 2033/0206* (2013.01); *B64D 2033/0273* (2013.01)

(58) Field of Classification Search
CPC . F02C 7/045; B64D 2033/0206; B64D 33/02; B64D 2033/0273
See application file for complete search history.

(56) References Cited

U.S. PATENT DOCUMENTS 8,876,467 B2 * 11/2014 Riou ...................... B64D 33/02
415/214.1
2014/0321999 A1 10/2014 Guilbert et al.

FOREIGN PATENT DOCUMENTS

EP 3 372 805 A1 9/2018
FR 2 989 814 A1 10/2013
(Continued)

OTHER PUBLICATIONS

International Patent Application No. PCT/FR2019/052208, International Search Report and Written Opinion dated Jan. 8, 2020, 12 pgs.

*Primary Examiner* — Michael L Sehn
(74) *Attorney, Agent, or Firm* — Lathrop GPM LLP

(57) ABSTRACT

The invention relates to acoustic management, on an aircraft turbomachine (3,12) or on a nacelle (1,10), via a panel (30,32). On a support (38) is reserved a recess (34), recessed with respect to a surrounding general surface (36) for contact with moving air. The recess (34) is adapted to receive the panel, as another so-called surface for contact with moving air. The support (38) and/or the panel comprise removable connecting elements for, in the recess (34), mounting it removably with respect to the support, the panel being an acoustic panel or a non-acoustic panel.

12 Claims, 4 Drawing Sheets

(56) References Cited

FOREIGN PATENT DOCUMENTS

FR         3 039 517 A1     2/2017
GB         2 429 043 A      2/2007

\* cited by examiner

METHOD FOR PREPARING A SUPPORT AND FOR ACOUSTIC MANAGEMENT ON A TURBINE ENGINE OR A NACELLE

CROSS-REFERENCE TO RELATED APPLICATIONS

This application is a 35 U.S.C. § 371 filing of International Application No. PCT/FR2019/052208 filed Sep. 20, 2019, which claims the benefit of priority to French Patent Application No. 1858549 filed Sep. 20, 2018, each of which is incorporated herein by reference in its entirety.

BACKGROUND/SUMMARY OF THE INVENTION

The present invention concerns the optimisation of an acoustic compromise on aircraft engines.

The implementation of acoustic panels in aircraft turbomachines, in particular aircraft engines, is, in part, justified by constraints associated with flight limitation policies at airports. These constraints are expressed in particular in terms of noise charges (financial charges applied to airlines for each use of an airport). These noise loads are at the discretion of each airport, which shall determine, in consultation with the users, the load structure to be applied locally It is therefore understandable that noise-reduction technologies can be of varying degrees of interest. This is why it is interesting to optimise the noise level of turbomachines taking into account the objectives of the users. This optimisation of the acoustic compromise can be passed on to reinforce other functionalities of the turbomachine (more efficient or more effective as regards the environment). Furthermore, it is noted that the attenuation levels obtained by some acoustic panels are not always perceptible to the human ear, even if they are clearly demonstrated by measurement.

It is therefore proposed here to optimise the ability to adapt the level of noise-reduction technology of a product (acoustic panels) depending on the needs of users. In addition, the aim is to adapt noise loads and to promote the versatility of solutions and thus to adapt the compromises between acoustic and aerodynamic requirements as best as possible.

Specifically, a method for the preparation of a support area and acoustic management is proposed for the above purposes:

on an aircraft turbomachine comprising an air inlet cone, and/or on a nacelle of such a turbomachine comprising:
at least one outer structure comprising at least one external annular casing, and possibly:
an inner structure comprising a fairing of a turbojet engine, which turbojet engine comprises a fan comprising the said air inlet cone, the inner structure of the nacelle then defining, with the outer structure, an annular air vein of secondary (cold) air, and
an exhaust nozzle comprising an outer primary nozzle sleeve and an inner primary nozzle tip defining between them an outlet channel for a primary air flow (hot) exiting the turbojet engine,
in which method:
on at least the said support area of the turbomachine or of the nacelle is reserved at least one recess, recessed with respect to a surrounding general surface of the said support defining a surface for contact with moving air:
in the turbomachine, on the air inlet cone, or
on the nacelle,
the recess being adapted to receive at least one panel, to be removably mounted thereon with respect to the support, said at least one panel, which is embodied herein, being an acoustic panel or a non-acoustic panel having a surface for contact with moving air, and,
depending on an acoustic criterion:
a) the recess is left free of any said panel placed therein, or
b) the recess being without any said panel placed therein, a said panel is placed therein, or
c) with a said panel placed in the recess, the panel is removed and the recess is left free of any said panel placed therein.

In this context, another technical difficulty has been identified: how to minimize the aerodynamic penalty caused by the depth of the recess? Although the implementation of a said support for the turbomachine or nacelle with a "continuous" line location (without marked angles, at least at the upstream and downstream ends, in the direction of flow of the said moving air) associated with the design of a panel of suitable shape will improve the situation, a solution with removable seals may be preferred, allowing the efficiency of the said optional panels to be maximised.

It is therefore also proposed that:
i) either, in case a) or c), removable aerodynamic smoothing elements with oblique and/or inflection point surfaces are placed in the recess, or side walls of the recess and of the panel with at least one inflection point, are shaped;
(ii) or in case b):
the recess being free of any said panel placed therein, removable aerodynamic smoothing elements having oblique and/or inflection point surfaces are arranged therein, and,
subsequently, before placing a said panel therein, the removable aerodynamic smoothing elements are removed and then a said panel is placed therein.

With such removable aerodynamic smoothing elements, it must be possible to maximise the volume available for the optional panels.

In this text, the words 'either'/'or' does not necessarily exclude a combination of both cases: (i) and (ii).

In addition to the aforementioned method, and to satisfy the context already mentioned, the invention also concerns an acoustic management system, comprising:
at least one support area:
on an aircraft turbomachine comprising an air inlet cone, and/or
on a nacelle of such a turbomachine comprising:
at least one outer structure comprising at least one outer annular casing, and possibly:
an inner structure comprising a fairing of a turbojet engine, which turbojet engine comprises a fan comprising the said air inlet cone, the inner structure of the nacelle then defining, with the outer structure, an annular vein of secondary air, and
an exhaust nozzle comprising an outer primary nozzle sleeve and an inner primary nozzle tip defining between them an outlet channel for a primary air flow exiting the turbojet engine, and
at least one panel,
characterized in that:
on at least the said support area of the turbomachine or of the nacelle (110) is reserved at least one recess, recessed with respect to a surrounding general surface of the said support defining a surface for contact with moving air:

in the turbomachine, on the air inlet cone, or on the nacelle, the recess is adapted to be able to receive said at least one panel, which has a surface for contact with moving air, the support and/or the said first panel comprise removable connecting elements for, in the recess, mounting the said at least first panel removably with respect to the support, said at least one panel is an acoustic panel or a non-acoustic panel.

With such an assembly, and as noted above, e.g. in a conventional configuration (panels of rounded, typically relatively cylindrical shape, with a marked thickness at the ends), removing an acoustic panel reveals a depth of recess (such as a difference in wall radii) between the location of the acoustic panel and the adjacent wall(s). This can induce a significant aerodynamic penalty, increasing with the difference in radii observed between two adjacent walls (which can be of the order of several tens of mm). Furthermore, it is noted that some noise-reduction technologies can help to minimise the size requirements (e.g. porous materials). Thus, it can be thought that the aerodynamic penalty associated with depth, which can be materialised by a vein cross-section deviation, can reach relatively low levels (acceptable with respect to a balanced compromise between performance and acoustics). The issue of size is particularly important with regard to the thickness of the panel. On a conventional panel, the thickness is conditioned by the tuning frequency (the one to be attenuated), and therefore by the wavelength of the acoustic signal. The lower the frequency, the higher the wavelength, and the thicker the panel should be.

Some solutions provide for so-called "folded"- or (re) folded—or "inclined" cavities which then extend in several directions (e.g. radial+axial) so as to minimise the thickness of the panel. With porous materials, it is rather the inner structure of the material that adjusts the tuning frequency, allowing low frequencies to be processed inside smaller spaces compared to conventional honeycomb panels.

However, even in small dimensions, discontinuities in the wall of the support (abrupt changes in an air flow line) can cause harmful aerodynamic disturbances. In order to address this problem, the following are proposed as alternative or complementary solutions:

with respect to the surrounding general surface of the support, the recess is defined by a simple recess with a single shoulder;

the recess is linked with the surrounding general surface of the said support by walls with inflection points;

the recess is linked with the surrounding general surface of the said support by walls with oblique surfaces;

the recess adapted to receive said panel and the panel adapted to be received therein have, facing each other, respective contours which are substantially complementary;

the recess has first side walls substantially perpendicular to the surrounding general surface of the support, received in the recess, the panel has second side walls substantially parallel to the first side walls, and without a panel in the recess, removable aerodynamic smoothing elements having oblique and/or inflection-point surfaces are placed in said recess adjacent to the first side walls;

the aforementioned assembly is provided with removable aerodynamic smoothing elements having oblique surfaces and/or surfaces with inflection points placed, or to be placed, in the recess;

the surface of the panel adapted for contact with the moving air is curved towards the centre with respect to its periphery and has a peripheral slope for junction with the surrounding general surface of the said support (the panel and said general surface thus come flush), when the panel is received in the recess.

More generally, claim 2 defines a preferred solution to the above problem in such an acoustic management system.

The invention will be better understood and other details, characteristics and advantages of the invention will appear on reading the following description, which is given as a non-limiting example, with reference to the attached drawings.

DETAILED DESCRIPTION

Figure 1:
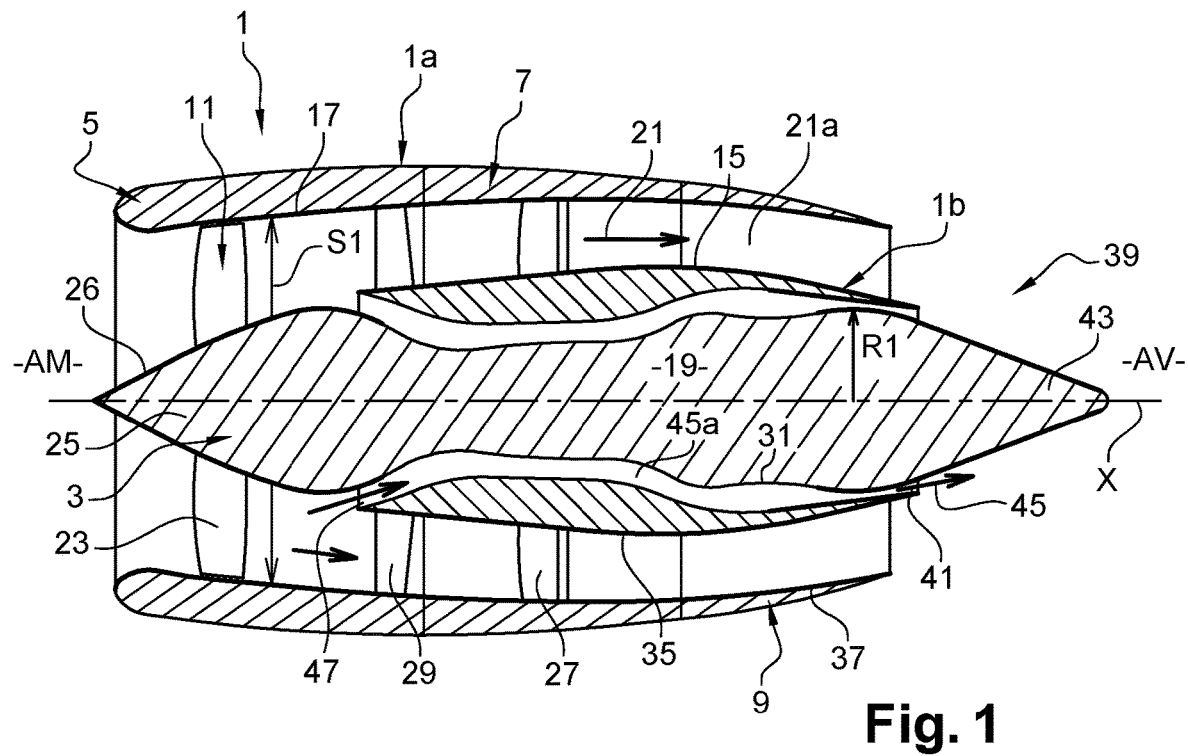
FIGS. 1 and 2 are two axial sections (X axis) of two applications of the solution of the invention.
Figure 2:
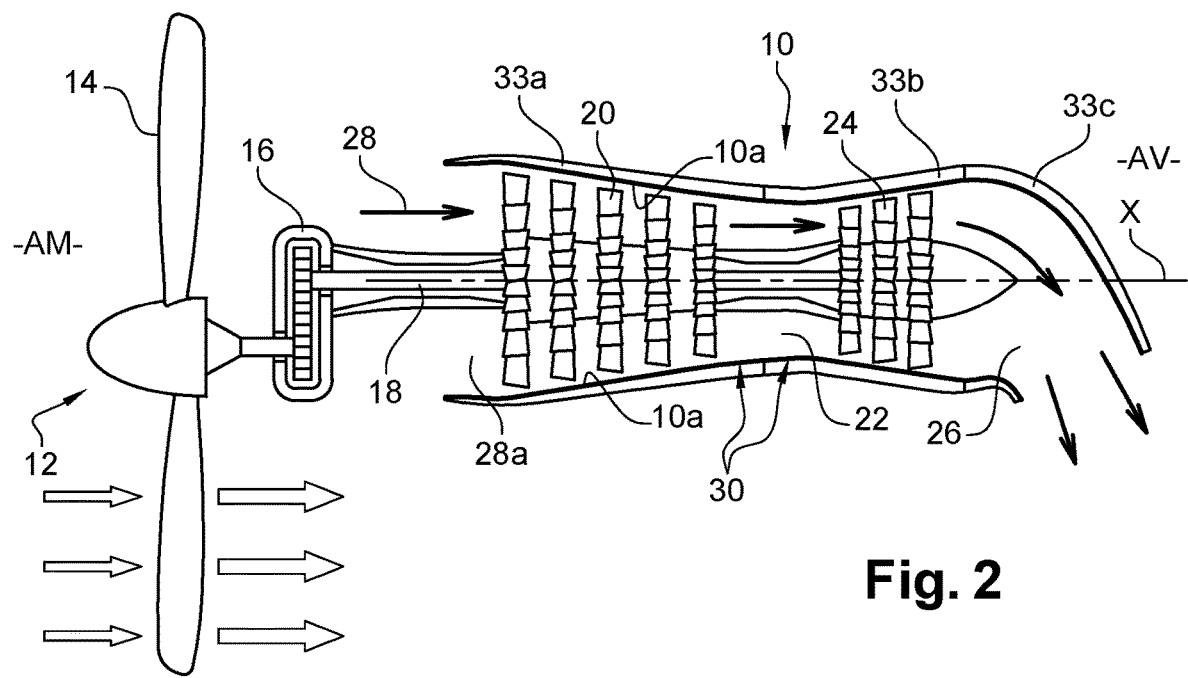

FIGS. 1 and 2 therefore show two possible cases in which the invention can be applied.

FIG. 1 shows a nacelle 1 of a double-flow aircraft turbojet 3. Nacelle 1, which therefore constitutes a support and cowling assembly for the aircraft turbomachine concerned and which ensures its connection with the aircraft fuselage, conventionally comprises an outer structure 1a comprising an upstream section 5 (US) forming an air inlet, a middle section 7 and a downstream section 9 (DS) which can incorporate means of thrust reversal. The upstream section 5 or the middle section 7 has an inner wall formed by a casing 17 of a fan 11 of the turbojet. In this description the fan casing 17 can define the "outer annular casing" mentioned elsewhere. The nacelle 1 also has an inner structure 1b comprising (at least) a fairing 15 of the turbojet engine 19. The outer structure 1a of the nacelle 1 defines, with the inner structure 1b, an annular air vein 21, often referred to as the "cold or secondary air vein", as opposed to the hot air generated by the engine 19, through which a so-called primary vein passes.

The fan 11 comprises an propeller having a plurality of blades 23, mounted about the axis of rotation X on a hub 25 rotatably mounted with respect to the fan casing 17. Downstream of the fan 11 there are outlet guide vanes 29 (OGV) to straighten the cold air flow generated by the fan 11. Structural arms 27 radially connect the nacelle 1 to the inner structure 1b. IGVs may be present in the form of a grid of vanes located in the primary flow 45a, upstream of the low-pressure compressor. The hub 25 is connected upstream to an air inlet cone 26 of the turbojet. The downstream section 9 comprises an inner fixed structure 31 (IFS) surrounding the upstream part of the turbofan 3, an outer fixed structure 35 (OFS) and a mobile cowling 37 that can include means of thrust reversal. A suspension mast (not shown) supports the turbojet 3 and the nacelle 1. The nacelle 1b ends downstream with a profiled exhaust nozzle 39. The outer and inner surfaces of the primary flow (respectively defined by the primary nozzle sleeve 41 and the primary nozzle plug 43) define between them the downstream terminal part, the outlet, the channel or the flow vein 45a of the primary air flow (hot) exiting the turbojet.

In FIG. 1, marked in bold type, are the contact surfaces for the moving air 21 or 45, which can typically be those of a panel 30, as provided for in the invention: acoustic or non-acoustic panel. This is the entire inner surface of the nacelle outer structure 1a, the (outer) fairing 15, the air inlet cone 26 to the primary air inlet lip 47, the fixed outer structure 35 and/or the inner module 43, from upstream of the primary air outlet to the downstream end of the outer module 41.

FIG. 2 shows a nacelle 10 of another aircraft turbomachine, here an aircraft turbo-propeller 12. The nacelle 10 is also known as a fairing. It comprises a structure, outer (in the sense that it surrounds vein 28a), comprising at least one annular casing, here three 33a,33b,33c, themselves therefore outer, around the X axis. The turbo-propeller 12 comprises, from upstream to downstream, along the axis of rotation X, a propeller 14 (a towing propeller, thus placed at the upstream end in this example), a reduction gear 16 engaged with the propeller and which drives an axial shaft 18 along which a compressor 20 is staggered, a combustion chamber 22 and a turbine 24, downstream of which the gases leave via an exhaust outlet 26. The nacelle 10 extends around the X-axis from the upstream end of the compressor 20 to the downstream end of the exhaust outlet 26.

In FIG. 2, the contact surfaces for the moving air 28 which, via vein 28a, enter the compressor 20, therefore the nacelle 10, and which can typically be those of a panel 30, as provided for in the invention, have also been marked in bold type: this is the entire inner surface 10a of the nacelle.

These two examples indicate that there are therefore certain critical areas on an aircraft turbomachine where the noise reduction of a surface exposed to the moving air (21,28,45) is specifically considered.

It is understood that the present invention is intended to seek to refine the ability to adapt the level of noise-reduction technology of such a surface depending on the needs of the users: depending on these needs, reducing noise is useful or not, necessary or not, required or not. It is important to be able to adapt to circumstances.

Figure 3:
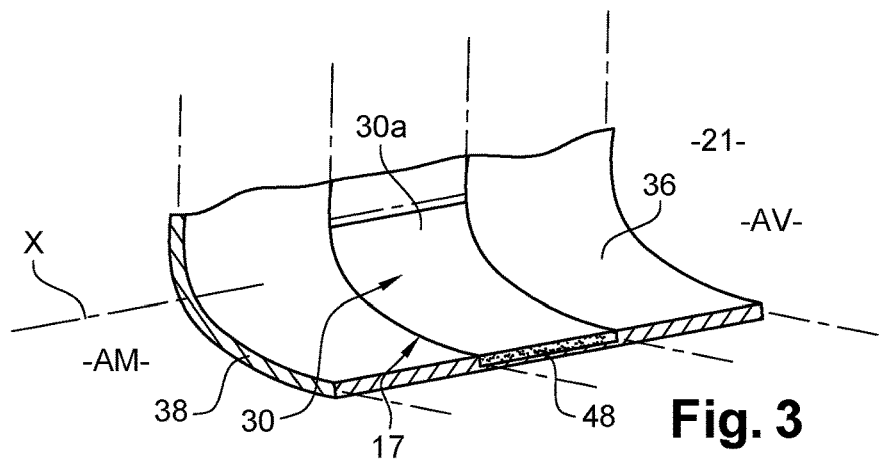
FIG. 3 shows a support area of a nacelle or of a aircraft turbomachine where acoustic management as proposed by the invention can apply.

FIG. 3 and following seek to illustrate the solutions proposed here to provide such an adaptation.

First of all, if noise limitation is sought, it is through the presence (in itself known) of a panel 30 with acoustic characteristics that this should/will be translated.

It is specified that a panel 30 (with acoustic characteristics) is a panel with the following characteristics:
the sound attenuation level associated with the panel is greater than 1 dB on at least one frequency between 100 and 10000 Hz,
and/or the absorption coefficient which characterises the panel is greater than 0.1 on at least one frequency between 100 and 10000 Hz,
and/or the open area ratio at the wall in contact with the flow (POA: Percent Open Area), excluding openings dedicated to the hanging system, is greater than 2.5% of the panel surface.

However, a substitute panel 32 with non-acoustic (characteristics) and/or, positively defined, with aerodynamic characteristics could be preferred.

It is specified that a panel 32 with non-acoustic (characteristics) or with aerodynamic characteristics is a panel with the following characteristics:
the sound attenuation level associated with the panel is less than 1 dB on frequencies between 100 and 10000 Hz,
and/or the absorption coefficient that characterizes the panel is less than 0.1 on frequencies between 100 and 10000 Hz,
and/or the rate of open area at the wall in contact with the flow (POA: Percent Open Area), excluding openings dedicated to the hanging system, is less than 2.5% of the panel surface, or even:
where the permeability of the various materials used to form the panel 30 is less than 90%,
and/or with a diameter of the possible pores (perforations) visible on the surface of the panel of less than 0.4 mm,
and/or the volume of any cavity (volumes of air considered to be closed if the openings communicating with the flow within the vein under consideration are not taken into account) has a volume greater than 30 cm3,
and/or which has no cavities (exclusively inner or opening on the surface),
and/or which does not have a sandwich structure (superposition of layers of different materials by gluing).

One aspect of the invention is therefore to be able to substitute a panel 32 with non-acoustic characteristics for a panel 30 with acoustic characteristics, and vice-versa.

Structurally different, the two panels 30,32 may be identical in terms of sizes (lengths, widths, thicknesses . . . ) as long as they are both adapted to be placed in a recess 34 formed with respect to a surrounding general surface 36 of a support 38 belonging to the turbomachine 3,12 or its nacelle 1,10.

It is specified that a panel 30 or 32 support 38 is a structure of the turbomachine 3,12 or its nacelle having a surface for contact with the moving air (21,28 or 45), as is (when this air is actually moving, therefore when typically the aircraft is flying):
the outer surface, respectively 30a or 32a, of panel 30 or 32, when the panel is located in the recess 34,
and the outer surface 34a of the recess 34, when no panel 30 or 32 is located in the recess.

Thus, the support 38 can be a frame element and/or comprising beams and itself panels, in particular to define the outer surfaces 30a,32a,34a. The outer surfaces 30a,32a,34a can have so-called aerodynamic characteristics, as can preferably be the surrounding general surface 36.

The general surrounding area 36 is the area adjacent to the recess 34. It limits or delimits it. Since the outer surfaces 30a,32a,34a must be for contact with the moving air (21,28 or 45) and are located in a gas vein (air or air/fuel mixture), they will be limiting surfaces of such a vein. In aircraft, these surfaces are well known. We know how to identify them and implement them. The outer surfaces 30a,32a,34a will typically be concave (radially outer vein boundaries), or convex (radially inner vein boundaries). Given that noise diffusion is to be managed a priori in all directions, placed in a so-called vein, the surrounding general surface 36 could typically be closed (present a perimeter), extend around the X axis, be annular around it, or parallel to it.

Figure 13:
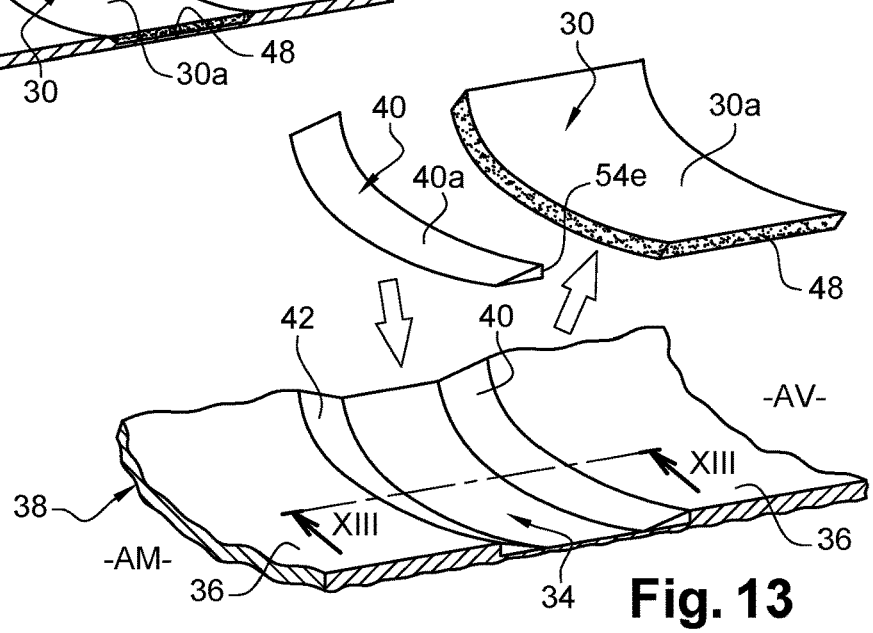
FIG. 13 shows an embodiment as an alternative to FIG. 4.
Figure 14:
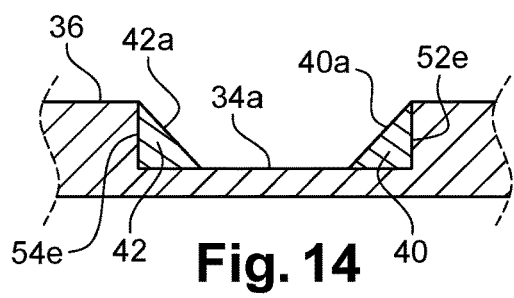
FIGS. 14, 15 show alternatives to the XIII-XIII axial section of FIG. 13.
Figure 15:
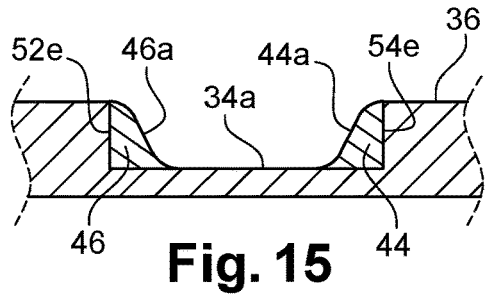

Since the panels 30,32 are a priori interchangeable and may or may not be present in the recess 34 designed to receive them alternatively, in a removable manner, the respective dimensions of the recess 34 (length L1, width I1, depth E1, FIG. 5) and those corresponding to the panels 30,32 (length L2, width I2, thickness E2, FIG. 4) will preferably be identical, to the installation/removal clearances, and except in the case of the use of removable aerodynamic smoothing elements, or seals, 40-46; see FIGS. 13-15.

Figure 6:
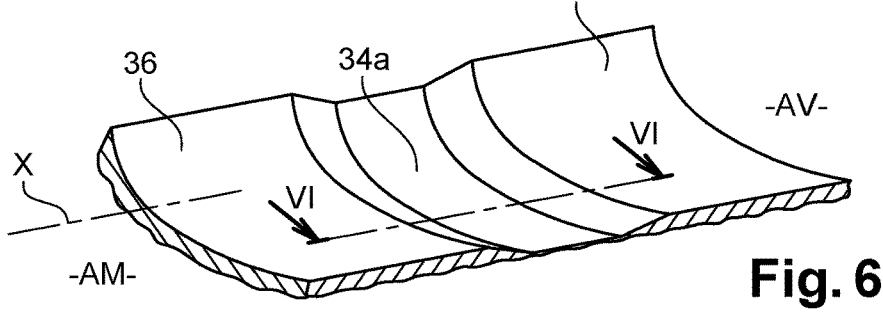
FIG. 6 shows an embodiment as an alternative to FIG. 4.
Figure 7:
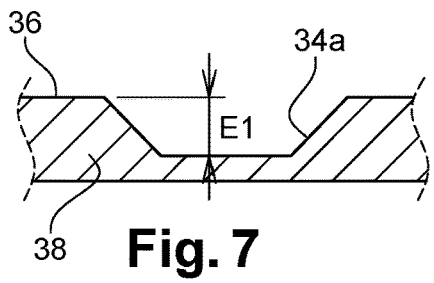
FIGS. 7, 8 shows alternatives to the VI-VI axial section of FIG. 6.
Figure 8:
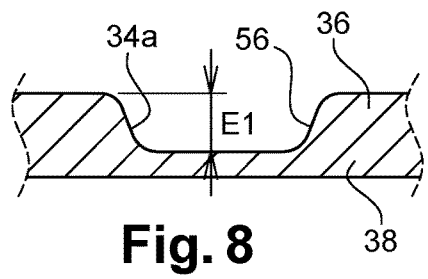

Before going back to such seals 40-46, it is important to specify that the following procedure is therefore to be followed at the location of each recess 34, depending on an acoustic or an aerodynamic criterion; Five possible cases:

a) the recess 34 having no said panel 30,32 placed therein, we leave the recess 34 as it is, free of any panel, as shown, for example, in FIGS. 6-8, b) the recess 34 having no said panel 30,32 placed therein, a said panel 30,32 is placed therein, or c) one said panel 30,32 being located in the recess 34, the panel is removed and the recess 34 is left without any said panel placed therein, as shown, for example, in FIG. 13, or d) the recess 34 is left with a said panel placed inside, as shown, for example, in FIG. 3.

Figure 4:
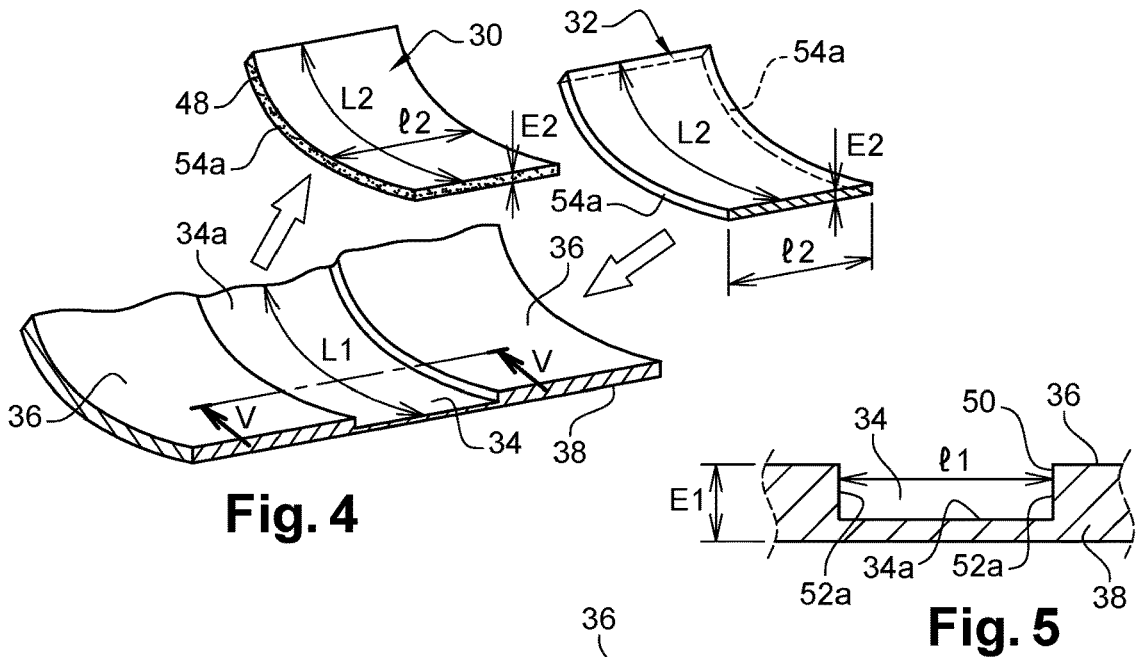
FIG. 4 shows the same area, panel removed, changed by another one ready to be put back in place of the first one, for the said acoustic management.
Figure 5:
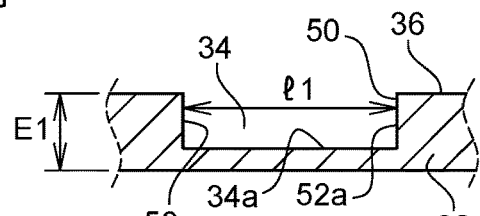
FIG. 5 is the V-V axial section of FIG. 3.

In a first embodiment more particularly illustrated in FIGS. 3-5, it is proposed to design:

a recess 34 to minimize aerodynamic penalties in the absence of a panel 30 or 32, as well as an acoustic panel 30 whose shape, including the dimensions, fits into the recess 34.

In this respect, it is understandable that, for example, in a vein such as that of 21a (air 21) and on the outer casing 17, in a classic configuration (panels of relatively cylindrical shape with a marked thickness at the ends—i.e. not thinning out at the ends to end up gradually decreasing in thickness—), the removal of the panels 30 (as in FIG. 5 where the mixed lines mark a possible annular continuity) reveals a difference in vein depth E1 (difference in wall radius) between the location of the acoustic panel and the surrounding general surface 36. This gives rise to a significant aerodynamic penalty, increasing with the difference in radii (thickness of E1) observed between two adjacent walls (of the order of several tens of mm). However, certain noise-reduction technologies can help to minimise the space required (porous materials 48, for example, such as sound absorbers: honeycomb, porous material, or other). Thus, the aerodynamic penalty associated with this deviation E1 of vein sections (see section S1 FIG. 1, perpendicular to the X axis, at the fan casing) can be reduced/limited to a relatively low level, acceptable for a balanced compromise between performance and acoustics.

This being the case, even in small dimensions (thicknesses/depths in particular), discontinuities in the surface 36 of the support (abrupt change of section S1 in the example) can generate relatively significant aerodynamic disturbances. In order to remedy this problem, it is proposed to shape the support 38 with a specific shape upstream (US) and downstream (DS) of the recess 34, and preferably of the area dedicated to the removable attachment of the optional panel 30 or 32.

Thus one may wish to avoid the shape of FIGS. 4, 5.

However, this shaping has some advantages:

with respect to the surrounding surface 36, the recess 34, clearly visible in FIG. 5, is defined by a single recess, with a single shoulder 50, the recess 34 has first side walls 52a which are substantially perpendicular to the surrounding surface 36 of the support, received in the recess 34, the panel has second side walls 54a substantially parallel to the first side walls, and as in the various situations shown, the recess 34 and the panel 30 or 32 adapted to be received there have, with respect to each other, substantially complementary contours, as can be seen in FIGS. 3 and 9-12.

Regarding this last aspect, one notes that, with reference to the sections of FIGS. 3 and 9-11 that the side walls (of thickness) of the recesses 34 and of the panels 30,32 respectively have indeed substantially complementary contours: 52b/54b; 52c/54c; 52d/54d.

Overall, in contrast to the abrupt shape of shoulder 50 in FIG. 5, the shapes of the other solutions above allow for a gradual transition via possible changes in the radii of the side walls concerned, such as 52c/54c; 52d/54d, particularly at the axial edges/axial side walls of the surface dedicated to the removable attachment of the panel 30 or 32 considered. It is these axial edges (upstream and downstream) that are shown in the sections of the various FIGS. 9 to 11 in particular). The other edges/side walls may have the same shapes as the so-called "axial" sides, i.e. sides perpendicular to the X-axis.

Figure 10:
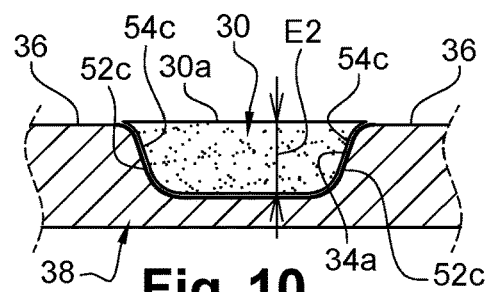
Figure 11:
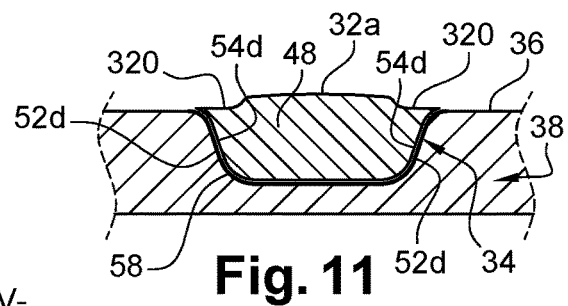
Figure 12:
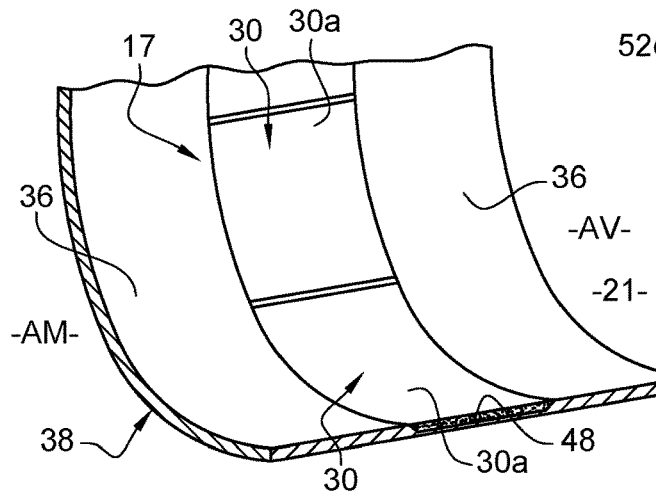
FIG. 12 shows an embodiment as an alternative to FIG. 3.

The surfaces 52b/54b; 52c/54c; 52d/54d are relatively tangential with respect to surfaces 34a,36 to be linked so as to minimize angles, and thus minimize aerodynamic disturbances. Thus, the drawing of this surface may have an inflection point, as in the solution, examples of which are shown in FIGS. 8, 10, 11; see marker 56 FIG. 8 as an example. The axial extent of each of these radius variations will advantageously be less than a quarter of the axial extent (dimension I2 in the example) of the optional panel 30,32, so as to minimize the loss on the volume dedicated to the panel (compared to the abrupt shape of shoulder 50 in FIG. 5).

If such an abrupt form is to be avoided, it is then proposed to consider the following, with reference to FIGS. 6-11.

At least at its axial ends, that is to say, upstream and downstream, the panel 30,32 has a shape that is oblique and/or has inflection point(s), as is the shape of the outer surface 34a of the recess 34 with respect to the surrounding general surface 36. And we see FIGS. 9-11 that these oblique and/or inflection point(s) shapes will advantageously be substantially complementary to each other; same dimensioning, even the same inflection point.

At least at its axial ends, that is to say, upstream and downstream, the radius corresponding to the alveolar surface of the panel is substantially equal to that of the adjacent side walls of the recess 34, as shown in FIGS. 10-11. This radius (such as R1 in FIG. 1) is defined by the distance between the X axis of the turbomachine and the surface of the panel in contact with the fluid flow of the vein, the alveoli in said surface being those existing in the case of a honeycomb-type acoustic panel—. In this case, seals could be placed between these side walls and the panel 30,32 to bridge the gaps and provide aerodynamic surface continuity at least at the axial ends of the panel.

At other points, the radius associated with the surface walls of the panel may vary and be slightly smaller than the radii observed at the axial ends, so as to slightly increase the thickness of the panel. It is then understood that by decreasing the above-mentioned radius (such as R1 FIG. 1), without modifying the position of the bottom of the 30,32 panel location, the thickness of this panel is increased.

The advantage of these types of configuration is to minimize the E1 depth in the absence of a panel, thus minimizing the associated aerodynamic penalties, while maximizing the thickness of the optional panel 30,32.

In a certain embodiment, the perforated surface of the panel may have a smaller radius than the adjacent side walls of the recess 34; see FIG. 11 and radius R1 FIG. 1, as an example for one of these surfaces which may be honeycombed. This configuration makes it possible to optimize the performance of the design of the considered vein, in the absence of a panel 30,32, for an optimised efficiency of the panel, to the detriment however of other aspects related to performance and operability, when a panel is present.

If, despite the above-mentioned optimisation options, a problem of insufficient panel thickness E2 30,32 remains, it is illustrated as an example in FIG. 11 that, received in recess 34, the panel may present an outer surface 30a or 32a (FIG. 11) suitable for contact with moving air, which is curved towards the centre with respect to its periphery and which peripherally presents a slope 320 for junction with the surrounding general surface 36 of the support, thus coming flush with it.

In connection with FIGS. 12-15, we shall now discuss a case where we wish to avoid a disadvantage of the above solutions, as shown in FIGS. 6-11, namely a loss of panel volume at the ends due to the gradual reduction of its thickness E2. The embodiment presented below proposes a solution including the installation of the removable aerodynamic smoothing elements 40-46 already mentioned, in order to maximize the volume of the recess 34 available for the said optional panels 30,32. In this configuration, it is proposed:

that the recesses 34 have first side walls 52e substantially perpendicular to the surrounding general surface 36 of the support (see FIGS. 14-15), this (at least) at the upstream and downstream ends, and, without a panel in the recesses 34, to place such removable elements 40-46 therein so that they are individually adjacent to said first 52nd walls of the corresponding recess.

The elements 40-46 have:

said second side walls 54e substantially parallel to the first side walls 52e, and directed towards the inside of the recess, lateral surfaces (thus in contact with the gas flow) which are oblique, flat, such as those 40a,42a in FIG. 14, or with one or more inflection points, such as surfaces 44a,46a in FIG. 15.

The removable elements 40-46 thus form seal-type elements that will smooth out the aerodynamic disturbances due to the recesses 34. They may have the following characteristics:

the seal 40-46 is in the form of a ring segment (see FIG. 13, element 40 only) or a ring (see FIG. 13, element 40,42 in place in the recess, not limited) when, radially to the X axis, a vein is limited by a concave (outer limitation) or convex (inner limitation) annular surface. In the case of a ring segment, the seals can be butt-jointed circumferentially until a complete ring is formed. This is transposable to the panel(s) 30 or 32: ring or sectors of a ring end to end, around the X-axis.

the radial overall size (on the X axis) associated with the section of the/each element 40,42 is approximately equal to the difference in radius between the surface dedicated to the integration of the optional panel and the bottom of the recess 34, the axial size associated with the section of each element 40,42 is less than 50% of the axial extension of the surface of the recess 34 dedicated to the integration of the panel, the surface of each element 40,42, in contact with the fluid flow (21,28 or 45), allows a progressive transition from the radius of the upstream surface 36 to the radius of this same surface, downstream. Preferably, this surface is relatively tangential to the sidewall surfaces to be joined, so as to minimize aerodynamic disturbances. Thus, the drawing of this surface may present a point of inflection, as already presented (see FIGS. 8, 10, 11 and their explanations), at its upstream and downstream ends, the/each element 40,42 may be glued to the walls 54e to be joined, in order to avoid any damage (tearing) caused by aerodynamic forces inside the vein, the/each element 40,42 can cover the attachment elements of the optional panels 30,32, so that no additional mounting operation is required to conceal these elements, the attachment elements for said optional panels may be used as attachment elements for the/each element 40,42.

Figure 9:
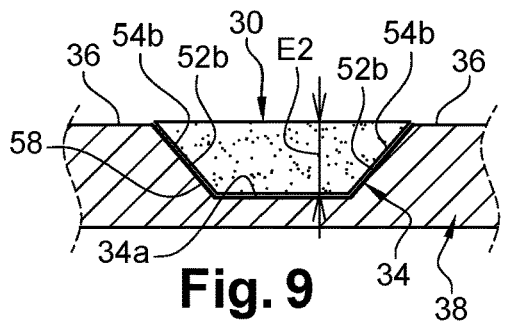
FIGS. 9, 10, 11 shows three alternatives to the V-V axial section, with different forms of recess 34, as well as for the panel placed in the recess.

For the removable attachment of the panels 30,32, as attachment element(s), also known as removable connecting elements, a glue or unscrewable screw fastener(s) or threaded bores in the support (especially in the recess 34) can be provided, for example, so as to avoid an additional assembly operation for concealing these elements. FIGS. 9,11, these removable connecting elements, here defined for example by an adhesive, have been marked 58. As removable fastening/bonding elements 58 used for attaching the panel to its support (casing, other part of the turbomachine or nacelle, etc.), one could provide material extrusions with suitable holes for bolted connections (removable) or material extrusions with contact surfaces for gluing the part directly to its support, or spacers aligned with threads in the panel support to ensure screw clamping and a stop on the support. The panel can also be equipped with other extrusions of material serving as a stop to facilitate the proper positioning of the panel in its place on the support.

All of the above can of course be used to improve the acoustic performance of a turbomachine already in service.

Thus, for example, during the assembly of an engine 3,12 and/or its nacelle, aerodynamic smoothing elements 40,42 could be positioned at the upstream and downstream ends of the surface 34 dedicated to the optional panel, on a fan casing or a nacelle, for example.

For routine maintenance, these components 40,42 may be dismantled and repaired, or dismantled and replaced by new parts At the request of a user, for example, elements 40,42 can be removed and replaced by panels 30, or more probably 32, in order to reduce the noise level of the turbomachine.

Conversely, at any time during maintenance, particularly if a panel 30 or 32 is damaged, for example, a user could request its replacement by a replacement panel 30 or 32 to reduce the cost associated with the maintenance of the user's engine.

In the foregoing it was assumed that a single said panel 30,32 could be placed in a recess 34. In fact the expression "one panel" (30,32) includes the fact that the (at least) one (first or second) panel may be formed of several sub-panels which together occupy the space of the recess 34, once placed therein.

Figure 16:
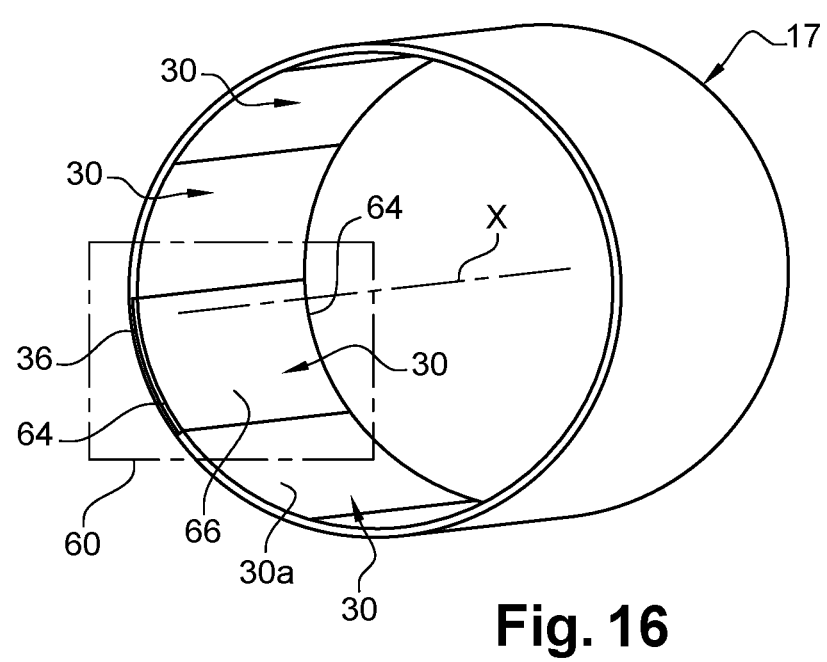
FIG. 16 shows a fan casing lock equipped with panels according to the invention.

In FIG. 16, an attempt is made to show an example of an area 60 of a support, or support structure, of a turbomachine or aircraft nacelle, here an annular fan casing whose inner wall (surface) is essentially formed by a circumferential succession of sectors defined by panels 30 and/or 32, if present, otherwise by the resets 34. This may be the same area as FIGS. 3, 4, 6, 12, 13, or any area containing at least one of the surfaces 10a, 15, 26, 35, 43 marked in bold type FIG. 1 or 2. We find the panels 30 and/or 32, here those 30 which, sectorized, together form the concave inner surface of the casing 17.

The invention claimed is:

1. A method for preparing a support area exposed to moving air and for an acoustic management:
   on an aircraft turbomachine comprising an air inlet cone, and/or
   on a nacelle of a turbomachine comprising:
      an outer structure comprising at least one outer annular casing, an engine, and,
      an inner structure comprising a fairing of a turbojet engine, which turbojet engine comprises a fan, the inner structure of the nacelle defining, with the outer structure, an annular air vein of secondary air,
   in which method:
      on said support area of the turbomachine or of the nacelle is reserved a recess recessed with respect to a surrounding general surface of said support area defining a surface for contact with the moving air:
         in the turbomachine, on the air inlet cone, or
         on the nacelle,
      depending on an acoustic criterion or an aerodynamic criterion:
         a) the recess is left without any acoustic panel or non-acoustic panel placed therein, or
         b) an acoustic panel or a non-acoustic panel is placed in the recess having a surface for contact with the moving air, or
         c) if an acoustic panel or a non-acoustic panel having a surface for contact with the moving air is already placed in the recess, the acoustic panel or non-acoustic panel is removed and the recess is left free of any of said acoustic panel or a non-acoustic panel placed therein, and:
      either, in case a) or c), removable aerodynamic smoothing elements having oblique surfaces and/or inflection-point surfaces are placed in the recess, or side walls of the recess and of the acoustic panel or non-acoustic panel are shaped with at least one inflection point,
      or, in case b):
         the recess is free of any said acoustic panel or non-acoustic panel placed therein and removable aerodynamic smoothing elements having oblique surfaces and/or inflection point surfaces are placed in the recess, and,
         subsequently, before placing said acoustic panel or non-acoustic panel in the recess, the removable aerodynamic smoothing elements are removed from the recess and then said acoustic panel or non-acoustic panel is placed in the recess.

2. An acoustic management assembly exposed to moving air and comprising:
   a support area located:
      on turbomachine comprising an air inlet cone, and/or
      on a nacelle of turbomachine comprising, an outer structure comprising an outer annular casing, and
   a panel removable from the support area,
   wherein:
      said support area of the turbomachine or of the nacelle comprises a recess, recessed with respect to a surrounding general surface of said support area defining a surface for contact with the moving air:
         in or on the turbomachine or
         in or on the nacelle,
      the recess is defined by a first bottom surface of the support area and a lateral surface of the support area extending peripherally to the first bottom surface, between the first bottom surface and the surrounding general surface,
      the recess is adapted to receive said panel, which has a second surface for contact with the moving air, an opposite third bottom surface lying close to the first bottom surface, when the panel is in the recess, and a fourth lateral surface extending between the second surface and the third bottom surface,
      the support area and/or said panel comprise removable connecting elements for, in the recess, mounting said panel removably with respect to the support area,
      said panel is an acoustic panel or a non-acoustic panel,
         the lateral surface is defined by walls having inflection points defining an aerodynamic smoothing zone on said lateral surface, and,
      when the panel is in the recess, the third bottom surface extends behind all, or essentially all, the second surface, and the third bottom surface is then backed by the first bottom surface which extends over all, or essentially all, the second surface, and,
      the first bottom surface is a solid surface with no passage therethrough for the moving air, so that said moving air cannot enter the turbomachine or the nacelle, through said first bottom surface when the panel is out of the recess.

3. The acoustic management assembly according to claim 2, wherein, when the panel is in the recess, the second surface is centrally curved and has a peripheral slope for joining the general surrounding surface of said support area surrounding the recess.

4. The assembly according to claim 3, in which the first lateral surface is defined by oblique surface walls and/or inflection point surface walls.

5. The acoustic management assembly according to claim 4, in which the fourth lateral surface is defined by oblique surface walls and/or inflection point surface walls.

6. The assembly according to claim 3, in which the first lateral surface and the fourth lateral surface have, facing each other, complementary respective contours, when the panel is in the recess.

7. The acoustic management assembly according to claim 2, further comprising an inner structure comprising a fairing of a turbojet engine, which engine comprises a fan comprising said air inlet cone, the inner structure of the nacelle then defining, with the outer structure, an annular air vein of secondary air.

8. The acoustic management assembly according to claim 2, further comprising an exhaust nozzle comprising an outer primary nozzle sleeve and an inner primary nozzle tip defining between them an outlet channel for a primary air flow exciting the turbojet engine.

9. An acoustic management assembly exposed to moving air and comprising:
   a support area located:
      on a turbomachine comprising an air inlet cone, and/or
      on a nacelle of a turbomachine comprising an outer structure comprising an outer annular casing, and
   a panel, which is an acoustic panel or a non-acoustic panel,
   wherein:
      on said support area of the turbomachine or of the nacelle is defined a recess, recessed with respect to a surrounding general surface of said support area defining a surface for contact with the moving air:
in the turbomachine, on the air inlet cone, or on the nacelle, the recess is defined by a first surface of the support area and a first lateral surface of the support area extending peripherally to the first surface, between the first surface and the surrounding general surface, the recess being adapted to receive said panel, which has a second surface for contact with the moving air, a third opposite surface lying close to the first surface of the support area, when the panel is in the recess, and a fourth lateral surface extending between the second surface and the third opposite surface, the support area and/or said panel comprise(s) removable connecting elements for, in the recess, mounting said panel removably with respect to the support area, when the panel is out of the recess, removable aerodynamic smoothing elements:

having oblique surfaces and/or inflection point surfaces for contact with the moving air, and, which are placed in said recess, adjacent to the first lateral surface.

10. The assembly according to claim 9, in which the first lateral surface and the fourth lateral surface have, facing each other, complementary respective contours, when the panel is in the recess.

11. The acoustic management assembly of claim 9, wherein, when the panel is in the recess, the respective lateral surfaces of the support area and the panel are substantially parallel.

12. The acoustic management assembly of claim 9, wherein the respective lateral surfaces of the support area and the panel are substantially perpendicular to the surrounding general surface when the panel is in the recess.

* * * * *